April 14, 1959  J. F. HUFF ET AL  2,882,503
PRESSURE AND TEMPERATURE MEASURING SYSTEM
Filed Oct. 25, 1954
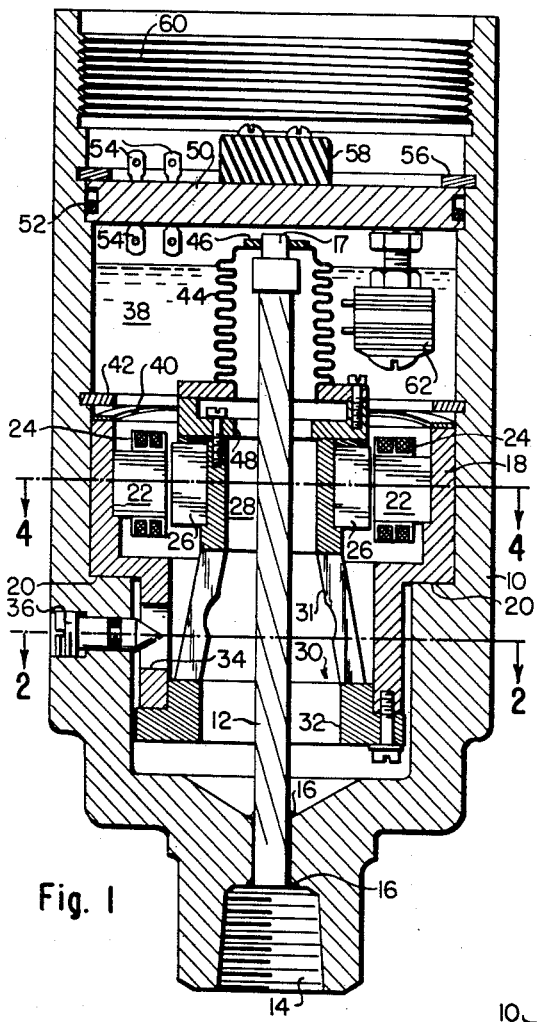
Fig. 1
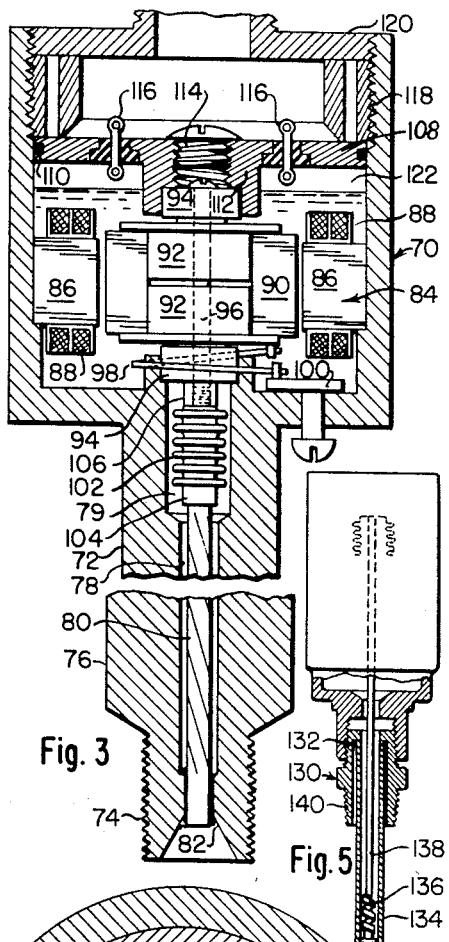
Fig. 3
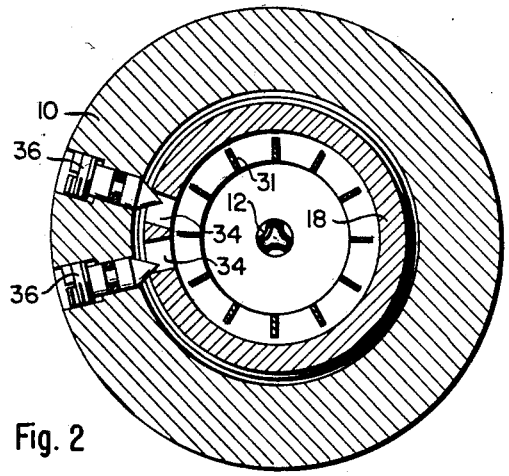
Fig. 2
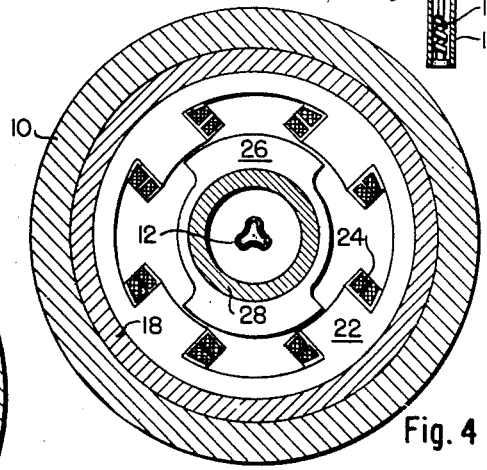
Fig. 4
Fig. 5
INVENTOR.
JOSEPH F. HUFF
SERGE S. WISOTSKY
BY
Kenway, Jenney, Witter & Hildreth
ATTORNEYS

United States Patent Office 2,882,503
Patented Apr. 14, 1959

2,882,503
PRESSURE AND TEMPERATURE MEASURING SYSTEM

Joseph F. Huff, Hyde Park, and Serge S. Wisotsky, Stoughton, Mass., assignors, by mesne assignments, to American Radiator & Standard Sanitary Corporation, New York, N.Y., a corporation of Delaware Application October 25, 1954, Serial No. 464,470

13 Claims. (Cl. 336—30)

This invention relates to measuring instruments, and more particularly to temperature and pressure gauges employing electro-magnetic devices as signal generators.

In recent years a great deal of effort has been expended in the development of gauges capable of indicating measured temperature and pressure at remote locations. Numerous electrical devices have been incorporated into gauges to make this possible. Of all the electrical devices tested, it has been found that electro-magnetic signal generators are most dependable and most readily lend themselves to this particular use.

In the pressure gauge art, various types of pressure pick-ups have been employed with the signal generators. Because linearity is a desirable feature, only those pressure pick-ups which render linear movement with applied pressure have been successfully used in these types of gauges. Other considerations in selecting pressure pick-ups have been size and stability.

In this invention, a twisted Bourdon tube is employed in combination with a dynamo transformer of the type disclosed in the Mueller Patent No. 2,488,734, issued November 22, 1949. Twisted Bourdon tubes have been recognized as rendering linear angular motion with pressures exerted internally thereof and therefore satisfy one of the principal requirements for an accurate gauge. The dynamo transformer renders a signal directly proportional to the angular displacement of its armature or rotor and, therefore, is ideally suited for use with the twisted Bourdon tube.

Having determined that those elements inherently possess the above-named desirable characteristics, it became necessary to provide means for coupling the twisted tube to the dynamo transformer to transfer the angular movement of the tube to the transformer armature.

Under pressure, twisted Bourdon tubes expand longitudinally and, in addition, substantial angular movement of the axis of the tube may be observed. If these extraneous movements are transferred to the armature, appreciable errors may be introduced into the measurement. Therefore, to obtain accurate pressure measurement, it is necessary to prevent the transfer of all extraneous motion from the tube to the armature.

The characteristics of the dynamo transformer which so well suit it for use in pressure gauges, make it equally desirable for use in gauges for measuring temperature. A helical bi-metal which responds to temperature changes will readily serve as an actuating means for the armature of the transformer, for the linearity of the angular movement of the bi-metal is comparable to the linearity of the twisted Bourdon tube. However, the axis of the helical temperature sensing element drifts in the same manner as the axis of the Bourdon tube, and unless some provision is made either to compensate for or prohibit transfer of the drift to the armature, substantial errors will be introduced into the temperature measurement.

The primary object of this invention is to provide temperature and pressure gauges capable of rendering highly accurate measurements at remote locations.

A more detailed object of this invention is to eliminate the transfer of all extraneous forces from the temperature or pressure pick-up to the signal generator.

To accomplish these and other objects we provide as one important feature of this invention a bellows capable of transmitting only torsional forces from the pick-up to the movable armature of the signal generator.

Another feature of this invention is the provision of a twisted Bourdon tube as a pressure pick-up connected through a bellows to the rotor of a dynamo transformer for varying the output signal of the transformer as a direct function of the pressure exerted on the tube.

Still another feature of this invention is the provision of a helical bi-metal as a temperature sensing element connected through a bellows to the armature of signal generator for varying the output signal thereof as a direct function of the sensed temperature.

These and other objects and features of the invention will be better understood and appreciated from the following detailed description of a number of embodiments thereof selected for purposes of illustration and shown in the accompanying drawing in which:

Fig. 1 is a view in section of a pressure gauge constructed in accordance with the invention, Fig. 2 is a view in section taken along section lines 2—2 of Fig. 1, Fig. 3 is a view in section of another pressure gauge constructed in accordance with this invention, Fig. 4 is a sectional view of the dynamo transformer taken along sight lines 4—4 of Fig. 1, and Fig. 5 is a view in section of a temperature gauge constructed in accordance with this invention.

Proceeding now to a description of Fig. 1, an inspection of the drawing reveals that the elements comprising the pressure gauge are organized within a casing 10 which houses the entire assembly. A twisted Bourdon tube 12 is coaxially disposed within the casing with one of its ends soldered in position as suggested at 16 and in fluid communication with the threaded fluid inlet 14. A plug 17 mounted on the terminal portion of the tube 12 serves to seal the end thereof to prevent fluid introduced into the tube from spilling out into the casing.

The effect upon the tube of a pressurized fluid introduced into its interior will now be described. As pressure is exerted against the walls of the Bourdon tube, it will untwist an amount directly proportional to the pressure applied. This untwisting will manifest itself in an angular movement of the free end of the tube about the axis thereof. At the same time, the tube's axis will drift from its normal position and some elongation of the tube may be experienced. The amount of drift and elongation are not useable functions of the exerted pressure and, therefore, may not be employed in determining the force exerted within the tube.

Proceeding with the description of the pressure gauge, a frame 18 is observed to be seated on the shoulders 20 of the casing, and houses the stator 22 of a dynamo transformer. The stator 22 is fixed to the frame by any appropriate means and carries a pair of coils 24 diagrammatically represented in Fig. 1. A rotor or armature 26 is supported by a frame 28 which is carried by a frictionless pivot 30, and is free to rotate through a limited number of degrees with respect to the stator.

A detailed illustration of the dynamo transformer is presented in Fig. 4. Because the transformer per se forms no part of this invention, a detailed description of its operation is unnecessary. Suffice it to state that as the rotor 26 moves from its illustrated neutral position, a voltage is produced which is proportional to the rotor displacement.

The frictionless pivot 30 serves as a bearing to support the rotor 26. The base 32 of the pivot is carried by the transformer frame 18 and is oriented to retain the rotor in a neutral position in the absence of an external torque exerted thereon.

It will be observed that the apparatus thus far described does not interfere with movement of the twisted Bourdon tube. The transformer is of a generally annular configuration and the frictionless pivot 30 comprises a number of leaf springs 31 arranged to form a truncated cone surrounding the lower portion of the tube. Sufficient clearance is provided about the tube so that any drifting from its illustrated position will not interfere with its angular movement.

The frictionless pivot which comprises the subject matter of a separate application Ser. No. 464,472, filed of even date herewith, now Patent No. 2,819,892, increases the versatility of the pressure gauge. For example, if for any reason some degree of non-linearity is desired for the output signal of the transformer with respect to the impressed pressure, the springs 31 may be shaped to render the desired non-linear signal. This phenomenon is fully explained in the above-named application and because it forms no part of this invention, further explanation is deemed to be unnecessary. The pivot's function in the instant case is readily apparent from the limited description and detailed illustration thereof.

Although the rotor 26 is initially assembled in its neutral position and the pivot 30 serves to stabilize the rotor in that position, a zero adjustment is provided to null the transformer. A pair of openings 34 in the wall of the transformer frame 18 cooperate with a pair of eccentrically mounted screws 36 which bear against opposite sides of each opening. The stator 22 carried by the frame may be angularly moved with respect to the rotor by moving the screws 36 either in or out of their mountings.

Proceeding with the description of the embodiment of this invention illustrated in Fig. 1, the transformer frame is secured in position against the shoulders of the casing 10 by means of a flexible washer 40 and a retaining ring 42. The ring 42 fits into an annular recess in the wall of the casing and firmly locks the assembly in the position illustrated.

The means for coupling the terminal portion of the Bourdon tube to the rotor of the transformer will now be described. A bellows 44 surrounding the free end of the tube is secured at one end to the upper terminal portion of the tube by a soldered connection 46, while the body of the bellows extends downwardly to an enlarged coupling 48 secured to the rotor frame. The coupling 48 may be secured to the lower end of the bellows by any convenient means to transfer the torque exerted by the tube to the rotor.

Because the function performed by the bellows lies at the heart of this invention, the nature of the bellows will be explained in detail. The physical characteristics of bellows are such that they will not readily serve as a means for transferring lateral or longitudinal motion from one member to another. That is to say, if a bellows is used as a coupling between two coaxially disposed members, lateral or axial movement of one member will be absorbed by the bellows and will not exert an appreciable force on the other. On the other hand, bellows possess rather rigid torsional characteristics and, therefore, will effectively transfer a torque exerted by one member to another. Because it is essential for accurate measurement that the axial and lateral alignment of the rotor with respect to the stator be maintained, the bellows' properties of lateral and longitudinal flexibility uniquely lend themselves to the performance of the particular function required. The angular movement of the terminal end of the Bourdon tube is readily transferred through the bellows to the rotor of the dynamo transformer but the creeping of the tube and any elongation thereof will not affect the rotor position. Because the angular movement of the Bourdon tube is the only dependable and accurate measure of the pressure applied against its interior walls, that motion alone is transmitted to the rotor and the signal produced by the transformer is proportional to the displacement of the rotor caused by the untwisting of the tubes.

To damp the assembly the casing may be filled with oil as suggested at 38. A baffle plate 50 secured in position in the casing by a retaining ring 56 carries an O-ring 52 to seal the casing and prevent leaking of the lubricant. Extending through the plate 50 are a number of electrical terminals 54 which provide means for wiring the transformer coils. Although only two such terminals are shown, obviously additional terminals are provided to make all the necessary connections. The actual wiring within the casing has been eliminated for the sake of clarity. A terminal box 58 carried by the baffle plate is provided to complete the electrical connections to an indicator (not shown).

A thermistor 62 is incorporated into the device and electrically compensates for temperature change within the casing. In use it will be connected in the transformer circuit and performs its intended function in the well known manner.

The casing 10 is provided with a threaded upper section 60 which may receive an explosion proof cover (not illustrated) to protect against faulty wiring of the assembly. The device is also sealed to prevent the escape of any fluid under pressure introduced into the twisted tube in the event of tube rupture. Obviously the provision of an explosion proof cover secured to the casing and the seals provided about the baffle plate and adjusting screws 36 will afford the utmost safety in the operation of the device.

From the foregoing description of the embodiment of this invention illustrated in Fig. 1, it will be appreciated that a pressure gauge has been devised which fulfills all of the objects set forth in the introductory paragraphs. Pressure measurements of the highest degree of accuracy are achieved by a relatively small gauge, and remote indication of the pressure measurement is readily available. Moreover, the device is obviously of sturdy construction and has the important advantage of long term stability.

The embodiment of this invention illustrated in Fig. 3 will now be described. Its general organization is similar to that of the preferred embodiment shown in Fig. 1. A generally cylindrical casing 70 is integrally formed with an elongated stem 72 coaxially disposed with and projecting downwardly from the main portion of said casing. The terminal portion of the stem is provided with a threaded section 74 which affords means for connecting the assembly to a line carrying the fluid whose pressure is to be measured. A hexagonal section 76 is formed in the otherwise cylindrical stem to receive a pipe wrench when the gauge is to be mounted for measuring fluid pressure.

A concentric bore 78 extends through the stem from its threaded section to the major portion of the casing. A twisted Bourdon tube 80 which may be identical to the tube 12 of the preferred embodiment is soldered in position as suggested at 82 at the terminal portion of the stem and extends upwardly to an enlarged chamber 79 communicating with the bore. Sufficient clearance about the tube is provided to permit drifting of the upper end of the tube under the influence of the fluid pressure against its interior walls.

A dynamo transformer 84 is secured within the major chamber of the casing and may be identical to the transformer illustrated in Figs. 1 and 4. The stator 86 of the transformer carries the coils 88 and is seated on an internal shoulder of the casing provided for that purpose. The rotor 90 of the transformer is supported by an internal frame 92 which cooperates with a pair of axially aligned bearings 94 within the casing chamber. The lower bearing is seated within an upturned annular flange at the base of the chamber and receives a shaft 96 which extends from the upper bearing through the rotor frame 92.

Before proceeding with the description of the coupling arrangement between the terminal portion of the Bourdon tube and the rotor, the means provided to zero the rotor with respect to the stator will be described. A hair spring 98 is observed to be anchored at one end to the rotor frame and surrounds the annular flange which serves as a seat for the lower bearing. The other end of the hair spring is secured to an eccentric 100 resting on the base of the chamber. By turning the eccentric, the spring 98 will move the rotor to any desired position to effect a fine adjustment of the transformer. Thus it will be appreciated that in this embodiment the zeroing of the transformer is accomplished by moving the rotor with respect to the stator while in the previously described embodiment the adjustment was made by moving the stator.

Proceeding now to the description of the means for coupling the Bourdon tube to the rotor of the dynamo transformer, a bellows 102 is observed to be positioned in the enlarged chamber 79 in the stem 72. An appropriate connection is made as by soldering between the lower end of the bellows and a plug 104 which serves to close the upper end of the tube. The upper end of the bellows is secured to the end of the shaft 96 by a coupling member 106 and in this manner the bellows may exert a torque upon the frame 92 of the rotor. The shaft which is rigidly secured to the rotor frame is free to rotate in the bearings and angularly moves under the influence of the twisted tube. The bellows 102 will perform in a manner identical to that of the bellows 44 in the preferred embodiment, i.e. it will absorb the drift and elongation of the tube while directly transferring the angular displacement thereof to the rotor.

To complete the assembly a baffle plate 108 is pressed into position above the transformer with its downwardly extending annular flange 112 providing a seat for the upper bearing 94. The marginal face of the plate carries an O-ring 110 which provides a seal against the inner wall of the casing. The central opening through the plate which houses the head of the shaft 96 is closed by a thread screw 114 and completes the fluid tight seal about the chamber. This is necessary to ensure against explosion should the Bourdon tube rupture under excessive pressures. The sealing of the chamber is also necessary to prevent leakage of the lubricant 122 which fills the casing.

A number of electrical connectors 116 are carried by the plate to provide means for making the necessary electrical wirings to the transformer coils. These connections are packed in the openings provided in the plate. To promote clarity, the actual conductors have not been illustrated.

The described structure within the casing is secured in position by an annular threaded ring 118 which bears against the upper surface of the baffle plate. To afford tightening of the ring, wrench holes are provided in its upper surface. An explosion proof plate having an upturned annular flange which defines an opening for the electrical wiring is fitted into the end of the casing. The explosion proof plate insures safe operation of the device, particularly against any break-down of the electrical circuit.

Having thus described in detail two embodiments of a pressure gauge constructed in accordance with this invention, the operation thereof will be fully apparent. Merely by connecting the threaded portion of either gauge casing into a line carrying fluid whose pressure is to be measured, a signal will be produced by the dynamo transformer which may be translated at any desired location.

The embodiment of this invention illustrated in Fig. 5 is particularly designed to measure temperature. With the single exception of the twisted Bourdon tube, all of the structure shown in Fig. 1 is duplicated in this configuration of our invention. No need exists therefore, to describe again the structure contained in the casing 10. Only the sub-assembly connected to the casing at the threaded inlet 14 will be described in detail.

An adapter 130 having a threaded pipe fitting 132 which registers with the threads of the inlet 14 carries an elongated tube 134. The tube as illustrated is welded to the adapter within the inlet and extends downwardly through the adapter below the casing. The lower terminal portion of the tube houses a helical bi-metallic element 136 which serves as the temperature pick-up for the gauge. The lower portion of the bi-metallic helix is secured to the bottom of the tube and under the influence temperature change its upper end will respond in torque in the well known manner.

A rod 138 secured at its upper end to the bellows 44 extends downwardly through the casing 10 and tube 134 and is secured at its lower end to the unrestrained end of the bi-metallic element. The rod serves to transmit the angular movement of the bi-metal to the bellows which in turn rotates the armature of the dynamo transformer.

A second threaded fitting 140 forming part of the adapter facilitates mounting the gauge at any location where temperature is to be measured. In operation, the fitting 140 need only be secured to the conduit or vessel containing the fluid whose temperature is to be measured. In response to the temperature of the fluid, the helical bi-metal will rotate the rod 138 transmitting the angular displacement to the dynamo transformer. The signal generated by the transformer will be directly proportional to the temperature of the fluid, for the rotation of the helix is linear with temperature.

Having described in detail the three embodiments illustrated, the advantages of the devices will be readily apparent. The explosion proof gauges may safely be located in hazardous areas. The gauges are unaffected by lateral and longitudinal vibrations and are of simple rugged construction which permits uninterrupted service.

From the foregoing description numerous modifications of this invention will be readily apparent to a man skilled in the art to which it pertains. Therefore, it is not intended that the scope of this invention be limited to the specifically described embodiments, but instead, by the appended claims and their equivalents.

What we claim as new and desire to secure by Letters Patent of the United States is:

1. Apparatus of the class described comprising a sensing element angularly movable in response to a sensed condition, electro-magnetic means including a rotor rotatable about a fixed axis for producing a signal which is predetermined function of the angular movement of said rotor, and a bellows directly interconnecting the sensing element to said electro-magnetic means for transferring angular movement of said sensing element to said rotor while absorbing incidental elongation thereof.

2. A pressure gauge comprising a casing, a twisted Bourdon tube mounted in said casing with one end fixed with respect to said casing, means for introducing fluid whose pressure is to be measured through said casing into said tube, a dynamo transformer including a rotor mounted for rotation about a fixed axis in said casing, and means including a bellows enclosing and directly connecting the free end of said tube to said rotor for transferring angular movement of said tube to said rotor.

3. Apparatus of the class described comprising a pressure pick-up for rendering a torque which is a function of the fluid pressure applied thereto, signal generating means including a rotor for rendering a signal which is a function of torque applied to said rotor, and means including a bellows mechanically and directly coupling the pick-up to said rotor for exerting a torque on said rotor resulting from fluid pressure applied to said pick-up.

4. Apparatus of the class described comprising a casing, a twisted tube fixed at one end to said casing adapted to receive fluid under pressure, the other end of said tube exerting a torque which is a function of the pressure of the fluid introduced thereto, signal generating means including a rotor for producing a signal which is a function of the torque applied to said rotor, and means including a bellows concentrically disposed with respect to the tube and mechanically connecting said other end of said tube to said rotor for exerting a torque on said rotor resulting from the pressure of the fluid received in said tube.

5. Apparatus of the class described comprising a substantially cylindrical casing, a twisted tube mounted in said casing coaxially therewith with one of its ends fixed with respect to said casing, a fluid inlet in said casing in direct communication with said tube, electrical means including a displaceable rotor mounted in said casing surrounding a portion of said tube permitting free angular movement thereof, said electrical means rendering a signal which is proportional to the displacement of said rotor, and means including a bellows mechanically connecting the free end of said tube to said rotor for transferring angular displacement of said end of the tube to said rotor.

6. Apparatus of the class described comprising a casing, a twisted Bourdon tube mounted at one end concentrically in said casing, an opening in a wall of said casing for introducing fluid under pressure into said tube, a dynamo transformer having a rotor and stator mounted in said casing coaxially with said tube, a pivotal support carrying the rotor of said transformer permitting limited angular movement of said rotor with respect to said stator, said stator producing a signal proportional to the angular displacement of said rotor, and means including a bellows interconnecting the free end of said tube and said rotor and mounted coaxially therewith for displacing said rotor in reaction to angular movement of the free end of said Bourdon tube.

7. Apparatus of the class described comprising a casing, a twisted Bourdon tube mounted in said casing adapted to receive fluid under pressure, a bellows carried by the other end of said tube coaxially therewith, a dynamo transformer mounted in said casing having a rotor rigidly and concentrically secured to said bellows, said transformer rendering a signal proportional to the angular displacement of said rotor, and at least a screw threaded in said casing and bearing on said dynamo transformer for nulling the signal thereof in the absence of fluid under pressure in said tube.

8. Apparatus of the class described comprising walls defining a chamber, a relatively narrow stem extending from one of said walls having a bore extending through the full length thereof communicating with said chamber, a twisted Bourdon tube positioned in said bore adapted to receive fluid under pressure, a bellows mounted concentrically on the end of said tube within said bore, and electrical means supported in said chamber having a rotor coupled to said bellows, whereby angular movement of said tube will be transferred to said rotor by said bellows.

9. Apparatus of the class described comprising a temperature sensitive element angularly movable in response to changes in temperature, a signal generator including an angularly movable member for producing a signal which is a known function of the angular movement of said member, and means including a bellows interconnecting the temperature sensitive element to said member for transferring angular movement of said element to said member.

10. Apparatus of the class described comprising a casing, a dynamo transformer having an angularly movable rotor mounted in said casing which renders a signal directly proportional to the angular movement of said rotor, a tube extending downwardly from said casing, a helical bi-metallic element mounted in said tube angularly movable in response to temperature changes, a rigid rod connected to said bi-metallic element extending upwardly through said tube into said casing, and a bellows secured to the upper end of said rod and to said rotor for transferring angular movement of said bi-metallic element to said rotor.

11. A gauge comprising a casing having an elongated pick-up member fast at one end to the casing and responsive in torque at its other end, corrugated tubular bellows directly secured in concentric relation to the said other end of the pick-up member, and signal generating means including a rotor rotatable about a fixed axis concentric with the pick-up and directly connected to said bellows thereby receiving full angular movement of the pick-up without incidental longitudinal movement thereof.

12. A gauge comprising a casing having an elongated pick-up member fast at its lower end to the casing and responsive in torque at its upper end, corrugated tubular bellows fast at one end thereof to and surrounding the upper end of the pick-up member, and signal generating means including a rotor rotatable about the axis of the pick-up member and directly connected to the other end of the bellows.

13. A gauge comprising a casing having an elongated sensing element attached at one end thereof to said casing and responsive in torque at its other end, signal generating means including a rotor rotatable about a fixed axis concentric with said sensing element, and means connecting said sensing element to said rotor, said means being rotatable with said sensing element and free of longitudinal movement therewith.

References Cited in the file of this patent

UNITED STATES PATENTS

| | | |
|---|---|---|
| 1,471,143 | Cromwell | Oct. 16, 1923 |
| 1,668,457 | Kath | May 1, 1928 |
| 2,266,277 | Seegers | Dec. 16, 1941 |
| 2,683,596 | Morrow | July 13, 1954 |
| 2,788,665 | Wiancko | Apr. 16, 1957 |